United States Patent [19]

Tezuka

[11] Patent Number: 4,629,251
[45] Date of Patent: Dec. 16, 1986

[54] RECLINING ANGLE ADJUSTMENT DEVICE
[75] Inventor: Takeshi Tezuka, Fujisawa, Japan
[73] Assignee: Shiroki Kinzoku Kogyo Kabushiki Kaisha, Fujisawa, Japan
[21] Appl. No.: 728,580
[22] Filed: Apr. 29, 1985
[30] Foreign Application Priority Data May 7, 1984 [JP] Japan ................... 59-66956

[51] Int. Cl.⁴ .............................................. B60N 1/02
[52] U.S. Cl. .................... 297/362; 297/367; 297/379
[58] Field of Search ................ 297/361, 362, 366–369, 297/354, 355, 378–379

[56] References Cited
U.S. PATENT DOCUMENTS

| 3,058,148 | 10/1962 | Beierbach et al. | 297/369 |
| 4,113,308 | 9/1978 | Werner et al. | 297/362 |
| 4,195,884 | 4/1980 | Muhr et al. | 297/362 |
| 4,394,048 | 7/1983 | Sakurai et al. | 297/367 |
| 4,457,557 | 7/1984 | Une | 297/362 |
| 4,505,515 | 3/1985 | Wilking et al. | 297/362 |

FOREIGN PATENT DOCUMENTS

| 2724047 | 12/1978 | Fed. Rep. of Germany | 297/362 |
| 54-24167 | 2/1979 | Japan . | |
| 57-11207 | 3/1982 | Japan . | |

Primary Examiner—William E. Lyddane
Assistant Examiner—Mark W. Binder
Attorney, Agent, or Firm—Finnegan, Henderson, Farabow, Garrett & Dunner

[57] ABSTRACT

A reclining angle adjustment device for use with a reclining seat includes a pair of lock mechanisms adapted to be disposed respectively on the outer and inner sides of the reclining seat. Each of the lock mechanisms is capable of rough adjustment of the angle of inclination of the second arm with respect to the first arm, and of fine adjustment of the angle of inclination. The reclining angle adjustment device also includes a pair of hook plates coupled respectively to release levers of the lock mechanisms, a connecting pipe extending between and attached to hook plates for transmitting motion between the release levers, and a connecting bar inserted through the connecting pipe and coupled to angularly movable shafts of the lock mechanisms for transmitting motion between the angularly movable shafts. The connecting bar includes ends having serrated inner peripheral surfaces defining recesses. The angularly movable shafts include ends having serrated outer peripheral surfaces meshing with the serrated inner peripheral surfaces of the connecting bar. The hook plates have holes defined therein in alignment with the connecting pipe and having an inside diameter smaller than the outside diameter of the ends of the connecting bar.

2 Claims, 8 Drawing Figures

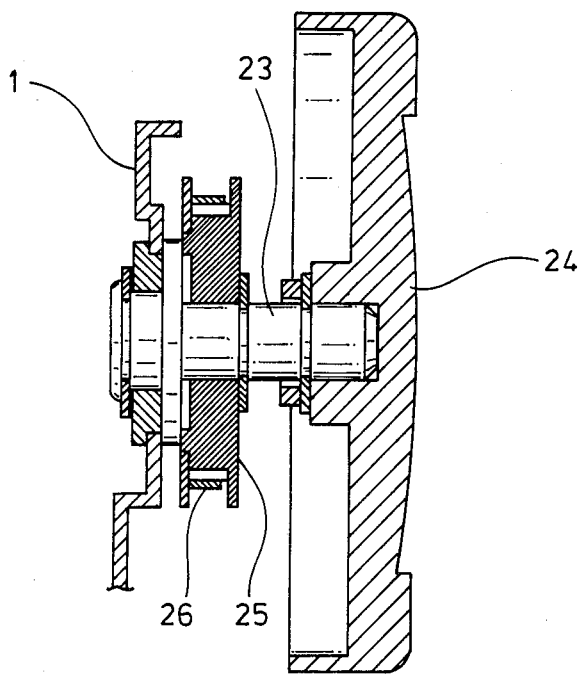
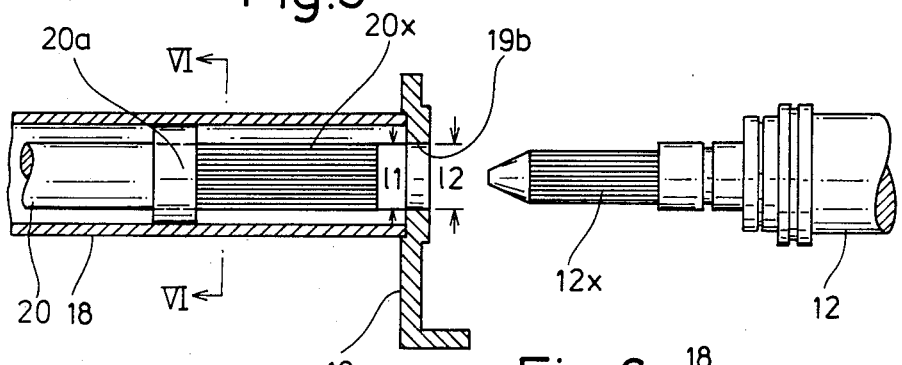
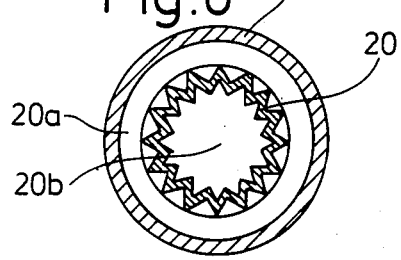

RECLINING ANGLE ADJUSTMENT DEVICE

BACKGROUND OF THE INVENTION

The present invention relates to a reclining angle adjustment device for adjusting the angle of inclination of the seat back of a reclining seat in a motor vehicle, i.e., the reclining angle of the reclining seat, and more particularly to a reclining angle adjustment device having lock mechanisms disposed respectively on the outer and inner sides of the reclining seat, each of the lock mecahnisms having rough and fine adjustment mechanisms.

There are known reclining angle adjustment devcies (see for example Japanese Patent Publication No. 57-11207) having a lock mechanism composed of a lower arm on which a pawl is angularly movably mounted and an upper arm on which an intermediate gear plate is mounted. By releasing the pawl from the intermediate gear plate with a release lever, the angle of inclination (or the reclining angle) of the upper arm pivotally coupled through an angularly movable shaft to the lower arm is roughly adjusted. The angular movement of a control handle attached to the lower arm is transmited to the upper arm through the angularly movable shaft and a planetary gear mechanism to effect fine adjustment of the reclining angle. Japanese Patent Publication No. 54-24167 discloses another reclining angle adjustment device having lock mechanisms disposed respectively on the outer and inner sides of a reclining seat. In the disclosed device, the angularly movable shaft of the planetary gear mechanism on the outer side of the reclining seat and the angularly movable shaft of the planetary gear mechanism on the inner side of the reclining seat are interconnected by a connecting lever for transmitting motion therebetween.

The angularly movable shafts are conventionally coupled to the connecting bar by constricted ends of square cross section of the connecting bar which are inserted respectively in square holes defined in the ends of the angularly movable shafts. It has been difficult to align the central axis of the intermediate portion of the connecting bar with the central axes of the square-shaped ends thereof. The central axes of the square-shaped ends of the connecting bar also tend to be misaligned. Therefore, difficulty has been encountered in smoothly transmitting the motion through the connecting bar.

SUMMARY OF THE INVENTION

It is an object of the present invention to provide a reclining angle adjustment device capable of smoothly transmitting motion between the angularly movable shafts of planetary gear mechanisms disposed on the outer and inner sides of a reclining seat.

Another object of the present invention is to provide a reclining angle adjustment device capable of rough and fine adjustment of the reclining angle and also of allowing a connecting mechanism for lock mechanisms on the outer and inner sides to be assembled with ease.

According to the present invention, there is provided a reclining angle adjustment device comprising a pair of lock mechanisms adapted to be disposed respectively on the outer and inner sides of a reclining seat, each of the lock mechanisms including a first arm, a pawl angularly movably mounted on the first arm, a second arm pivotally connected to the first arm by an angularly movable shaft, an intermediate gear plate mounted on the second arm for meshing with the pawl, a release lever rotatably mounted on the angularly movable shaft for releasing the pawl from the intermediate gear plate for rough adjustment of the angle of inclination of the second arm with respect to the first arm, a planetary gear mechanism, and a control handle attached to the first arm for turning the second arm through the angularly movable shaft and the planetary gear mechanism for fine adjustment of the angle of inclination; a pair of hook plates coupled respectively to the release levers of the lock mechanisms; a connecting pipe extending between and attached to the hook plates for transmitting motion between the release levers; and a connecting bar inserted through the connecting pipe and coupled to the angularly movable shafts of the lock mechanisms for transmitting motion between the angularly movable shafts, the connecting bar including ends having serrated inner peripheral surfaces defining recesses, the angularly movable shafts including ends having serrated outer peripheral surfaces meshing with the serrated inner peripheral surfaces of the connecting bar, the hook plates having holes defined therein in alignment with the connecting pipe and having an inside diamerer smaller than the outside diameter of the ends of the connecting bar.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a cross-sectional view taken along line IV—IV of FIG. 1;

FIG. 5 a sectional side elevational view of certain components of the reclining angle adjustment device illustrated in FIG. 1;

FIG. 6 is a cross-sectional view taken along line VI—VI of FIG. 5;

DESCRIPTION OF THE PREFERRED EMBODIMENT

Figure 1:
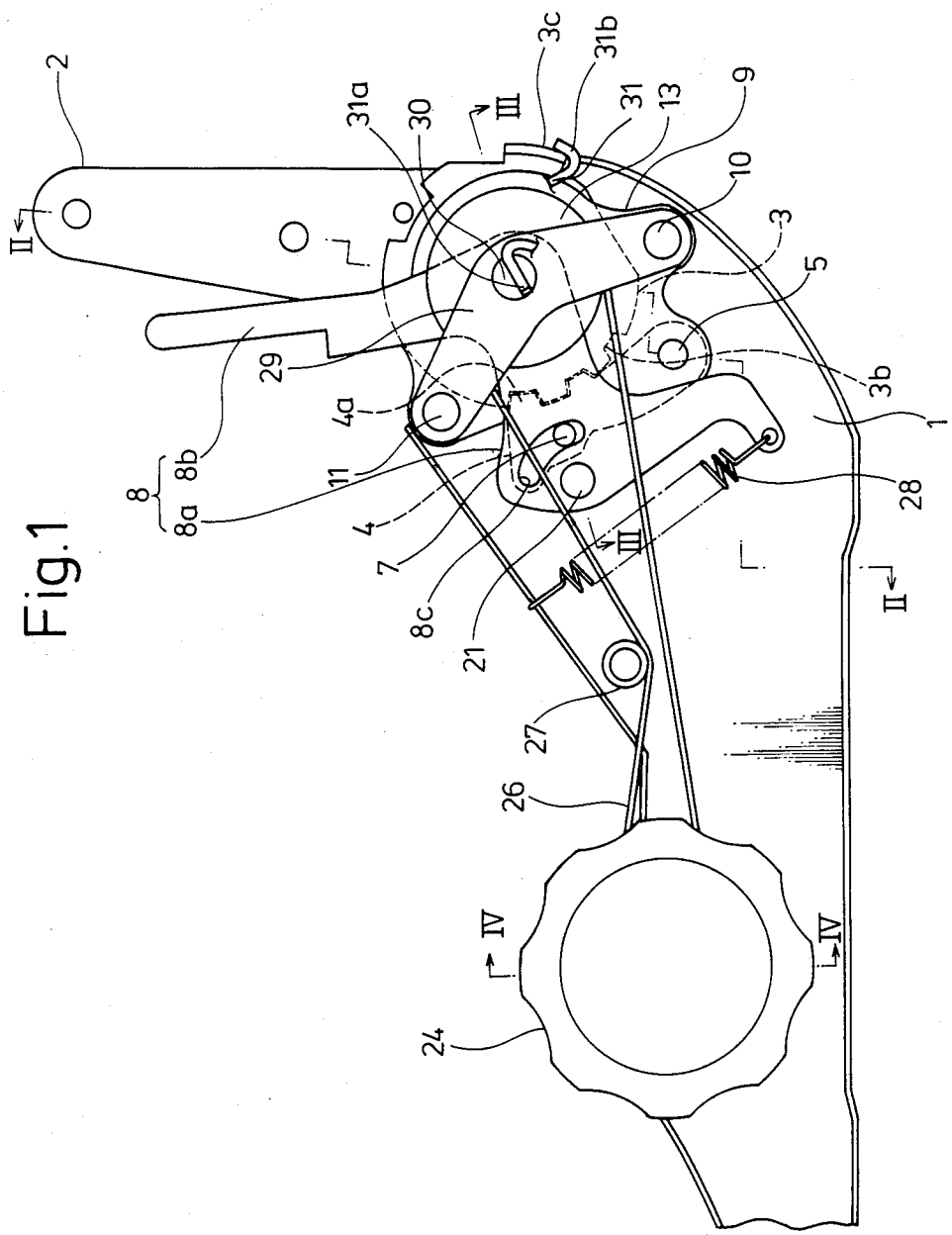
FIG. 1 a side elevational view of a reclining angle adjustment according to the present invention.
Figure 2:
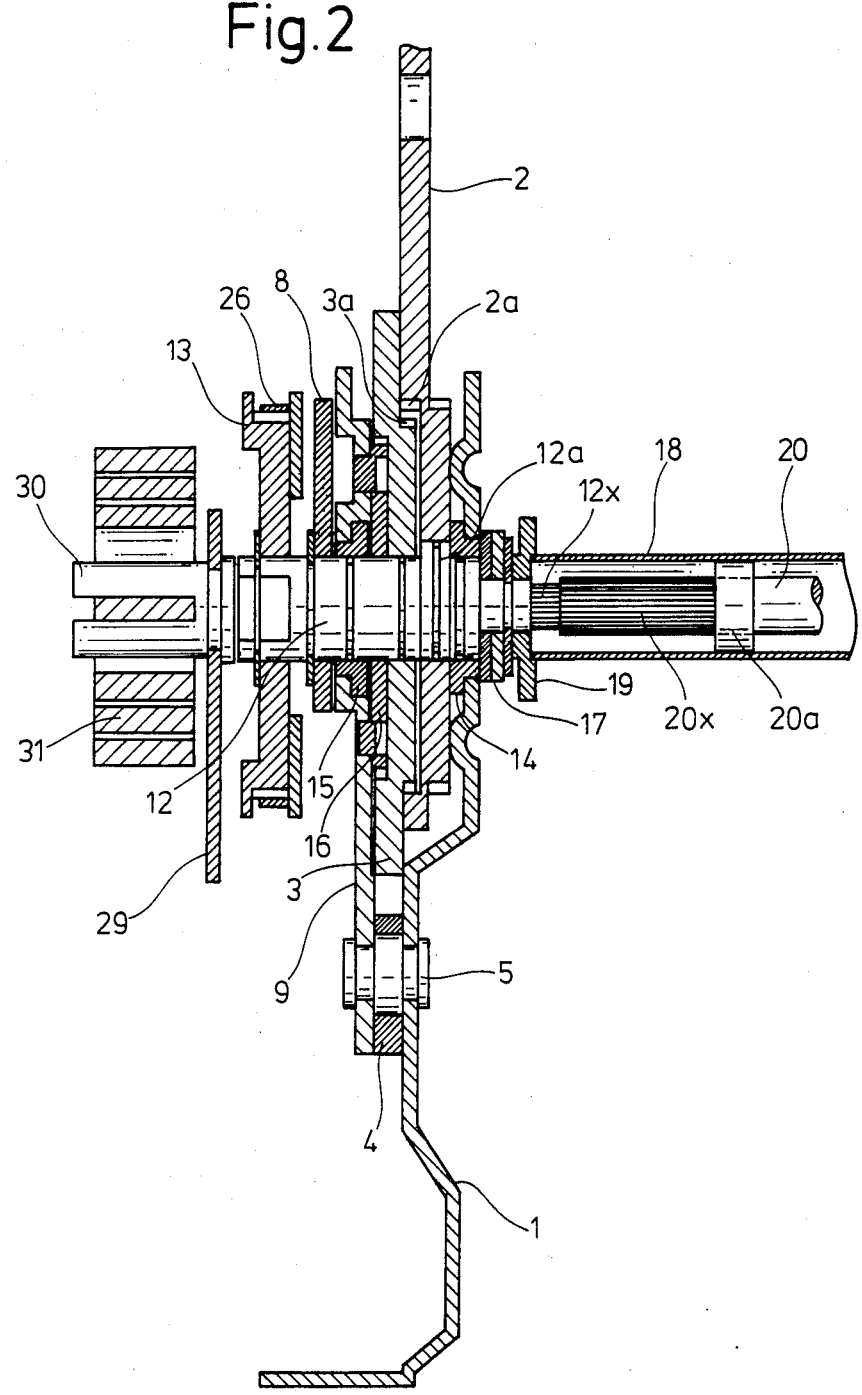
FIG. 2 is a cross-sectional view taken along line II—II of FIG. 1.
Figure 3:
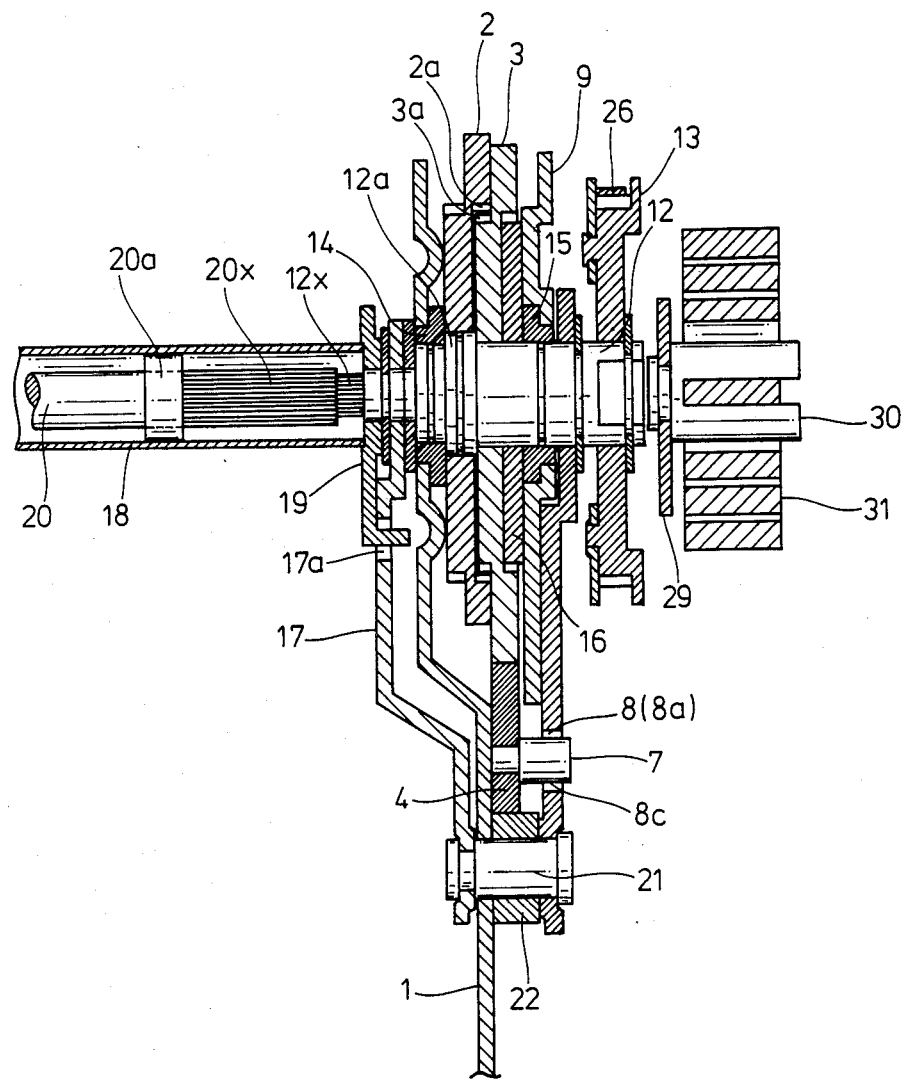
FIG. 3 is a cross-sectional view taken along line III—III of FIG. 1.
Figure 7:
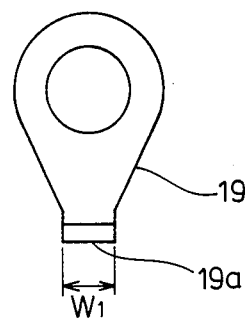
FIG. 7 is a front elevational view of a hook plate.
Figure 8:
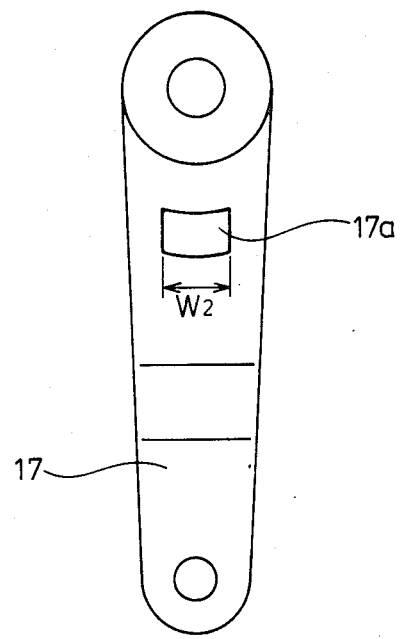
FIG. 8 is a front elevational view of an arm plate.

FIGS. 1 through 8 show a lock mechanism of a reclining angle adjustment device, disposed on the outer side of a reclining seat, and also a portion of a connecting mechanism by which the lock mechanisms on the outer and inner sides of the reclining seat are interconnected. Although the lock mechanism on the inner side of the reclining seat is not shown, it is of the same construction as shown except that it is of the mirror image of the illustrated lock mechanism on the outer side.

The reclining angle adjustment device includes a lower arm 1 fixed as by screws to the seat cushion (not shown) of a reclining seat, and an upper arm 2 fixed as by screws to the seat back (not shown) of the reclining seat. The upper arm 2 has an inner gear 2a embossed on a side thereof as by precision pressing. An intermediate gear plate 3 is disposed adjacent to the upper arm 2 and has an outer gear 3a embossed as by precision pressing on a side thereof facing the inner gear 2a of the upper arm 2. The intermediate gear plate 3 also has a rack 3b on an outer edge thereof. The number of teeth of the inner gear 2a is selected to be at least one larger than the number of teeth of the outer gear 3a.

A pawl 4 is pivotally mounted on the lower arm 1 by a stepped pin 5 and has locking teeth 4a for engaging the rack 3b of the intermediate gear plate 3. A pin 7 is mounted on the pawl 4 near the locking teeth 4a and projects in a direction opposite to the lower arm 1, the pin 7 being inserted in a cam slot 8c defined in a noncontrol portion 8a of a release lever 8. A subplate 9 is positioned more closely than the release lever 8 to the lower arm 1. The subplate 9 has attachment holes corresponding in position to the stepped pin 5 and stepped pins 10, 11, and is secured through the attachment holes to the lower arm 1 to prevent the upper arm 2, the intermediate gear plate 3, and the pawl 4 from being disassembled. An angularly movable shaft 12 includes an eccentric portion 12a disposed partially on a concentric portion thereof.

For assembly, the concentric portion of the angularly movable shaft 12 is angularly movably inserted through a bushing 14 of the lower arm 1, a central hole defined in the intermediate gear plate 3 in concentric relation to the outer gear 3a, a bushing 15 of the subplate 9, a spacer 16 attached to the subplate 9, and a hole defined in the release lever 8. The eccentric portion 12a of the angularly movable shaft 12 is angularly movably inserted through a hole defined in the upper arm 2 in concentric relation to the inner gear 2a. A pulley 13 is mounted on one end of the concentric portion of the angularly movable shaft 12 for angular movement therewith. Thus, the upper arm 2 and the intermediate gear plate 3 are angularly movably mounted respectively on the eccentric portion 12a and the concentric portion of the angularly movable shaft 12, and the inner gear 2a and the outer gear 3a are held in mesh with each other, thereby providing a planetary gear mechanism.

An arm plate 17 is angularly movably mounted on the concentric portion of the angularly movable shaft 12. The arm plate 17 has a hole 17a defined in an intermediate portion thereof and in which there is fitted a hook 19a of a hook plate 19 fixed to a connecting pipe 18 for rough adjustment of the reclining angle of the reclining seat. The connecting pipe 18 serves to transmit the motion of the release lever 8 to the release lever of the identical lock mechanism disposed on the inner side of the reclining seat. The hook 19a has a width $W_1$ selected to be smaller than the width $W_2$ in the arm plate 17a in order to take up the difference between locking positions of the lock mechanisms on the outer and inner sides, thus preventing the reclining seat back from being partly locked. A connecting bar 20 for fine adjustment of the reclining angle is connected to the angularly movable shaft 12 for transmitting the motion of the angularly movable shaft 12 to the angularly movable shaft of the inner lock mechanism.

The connecting bar 20 has an end 20x having an axially opening recess 20b with its inner peripheral surface serrated. The angularly movable shaft 12 has an end 12x with its outer peripheral surface serrated. The connecting bar 20 and the angularly movable shaft 12 are interconnected through the serrated peripheral surfaces for transmitting motion therebetween. The distal end of the angularly movable shaft 12 is chamferred to allow easy insertion thereof into the recess 20b in the connecting bar 20. The connecting bar 20 is inserted in its entirety through the connecting pipe 18. The end 20x has an outside diameter $l_1$ larger than the inside diameter $l_2$ of a shaft insertion hole 19b defined in the hook plate 19. A washer 20a of synthetic resin with its inner peripheral surface serrated is fitted over the end 20x of the connecting bar 20 to keep the connecting bar 20 positioned substantially centrally of the connecting pipe 18 at all times, so that the connecting bar 20 can easily be assembled in position. The arm plate 17 has its distal end secured by a stepped pin 21 to an intermediate portion of a noncontrol portion 8a of the release arm 8. A roller 22 is fitted over the stepped pin 21 and held against the back of the pawl 4 to maintain the locking teeth 4a of the pawl 4 and the rack 3b of the intermediate gear plate 3 in reliable mesh with each other.

A handle shaft 23 is angularly movably mounted on the lower arm 1. A control handle 24 is mounted on an end of the handle shaft 23, and a pulley 25 is mounted on an intermediate portion of the handle shaft 23 for angular movement therewith. A belt 26 is trained around the pulley 25 and the pulley 13 and includes an intermediate portion pressed by a guide roller 27 mounted on the lower arm 1. The pulleys 13, 25 and the belt 26 have grooves for preventing slippage therebetween.

A spring 28 acts between the release lever 8 and the lower arm 1 for normally urging the pawl 4 to turn in a direction to mesh with the intermediate plate 3. A pin bracket 29 is secured by the stepped pins 10, 11 to the lower arm 1 and has an intermediate portion coaxial with the angularly movable shaft 12 and to which a grooved pin 30 is fixed.

A balancing spiral spring 31 has an inner end 31a disposed in the groove of the pin 30. The spiral spring 31 has an outer end 31b held in engagement with a hook 3c of the intermediate gear plate 3.

Operation of the reclining angle adjustment device thus constructed will be described hereinbelow. In the position shown in FIG. 1, the locking teeth 4a of the pawl 4 mesh with the rack 3b of the intermediate gear plate 3 to lock the gear plate 3. Therefore, the outer gear 3a is fixed with respect to the lower arm 1. By turning the control handle 24, the angularly movable shaft 12 is turned through the belt 26 to cause the upper arm 2 to turn at a prescribed speed-reduction ratio through the planetary gear mechanism for fine adjustment of the reclining angle. Since the angular movement of the angularly movable shaft 12 is transmitted through the connecting bar 20 to the inner lock mechanism, the upper arm of the inner lock mechanism is moved in the same manner, and hence the upper arms of the outer and inner lock mechanisms are tilted through the same angle. For rough adjustment of the reclining angle, a control portion 8b of the release lever 8 is turned counterclockwise in FIG. 1 by the passenger on the reclining seat. The roller 22 is also turned counterclockwise in a direction to disengage from the pawl 4. (The lower arm 1 has arcuate holes defined therein to allow the pins 7, 21 to move therein for permitting the roller 22 to turn as described above.) The pin 7 in the cam slot 8c now moves toward the control handle 24. The locking teeth 4a are then brought out of mesh with the rack 3b of the intermediate gear plate 3, which is now unlocked. Since the angular movement of the release lever 8 is also transmitted through the pin 21, the arm plate 17, the hook plate 19, and the connecting pipe 18 to the inner lock mechanism, the intermediate gear plate of the inner lock mechanism is also unlocked. In the outer lock mechanism, therefore, the intermediate gear plate 3 and the upper arm 2 are turned counterclockwise in FIG. 1 under the force of the spiral spring 31. The inner lock mechanism operates in the same manner. The passenger on the reclining seat then pushes the seat back with his back until the seat back is tilted at a desired reclining angle. The release lever 8 is then released by the passenger whereupon the reclining angle has now been roughly adjusted at angular intervals of meshing engagement between the intermediate gear plate 3 and the pawl 4.

With the arrangement of the present invention, the end 20x of the connecting bar 20 is of a serrated construction which can be centered relatively easily and is held in mesh with the end 12x of the angularly movable shaft 12. Thus, the motion can smoothly be transmitted between the angularly movable shaft 12 of the outer lock mechanism and the angularly movable shaft of the inner lock mechanism. Since the outside diameter of the end 20x of the connecting bar 20 is larger than the inside diameter of the hole 19b in the hook plate 19, the connecting bar 20 is prevented from being displaced out of the connecting pipe 18. This allows the connecting bar 20 to be assembled in position with ease.

Although a certain preferred embodiment has been shown and described, it should be understood that many changes and modifications may be made therein without departing from the scope of the appended claims. For example, while the connecting bar 20 is shown as being housed entirely in the connecting pipe 18, the end 20x of the connecting bar 20 may be reduced in diameter and may partly be placed out of the hole 19b in the hook plate 19. It is ordinary practice to adjust the reclining angle through the outer lock mechanism only. If the passenger follow this practice, then the control handle 24, the handle shaft 23, the pulley 25, the pulley 13, the belt 26, and the control portion 8b of the release lever 8 in the inner lock mechanism may be dispensed with.

What is claimed is:

1. A reclining angle adjustment device comprising:
   (a) a pair of lock mechanisms one of each connected to outer and inner sides of a reclining seat, each of said lock mechanisms including a first arm fixed to a seat cushion, a pawl angularly movably mounted on said first arm, a second arm fixed to a seat back and pivotally connected to said first arm by an angularly movable shaft, an intermediate gear plate mounted on said second arm with an outer gear and a rack for meshing with said pawl, a release lever rotatably mounted on said angularly movable shaft for releasing said pawl from said rack of said intermediate gear plate for rough adjustment of the angle of inclination of said second arm with respect to said first arm, a planetary gear mechanism and a control handle attached to said first arm for turning said second arm through said angularly movable shaft by rotation transmitting means and said planetary gear mechanism for producing fine adjustment of said angle of inclination;
   (b) a pair of hook plates coupled respectively to said release levers of said lock mechanisms;
   (c) a connecting pipe extending between and attached to said hook plates for transmitting motion between said release levers; and
   (d) a connecting bar inserted through said connecting pipe and coupled to said angularly movable shaft of said lock mechanisms for transmitting motion between said angularly movable shafts, said connecting bar including ends having serrated inner peripheral surfaces defining recesses, said angularly movable shafts including ends having serrated outer peripheral surfaces meshing with said serrated inner peripheral surface of said connecting bar, said hook plates having holes defined therein in alignment with said connecting pipe and said holes having a diameter smaller than the outside diameter of said ends of said connecting bar, wherein said first arm includes an inner gear engaged with said outer gear of the intermediate gear plate having said rack meshing with said pawl, said inner gear plate being rotatably and eccentrically mounted on said angularly movable shaft and said intermediate gear plate being concentrically mounted on said angularly movable shaft.

2. A reclining angle adjustment device according to claim 1 wherein said rotation transmitting means includes a belt.

* * * * *